United States Patent [19]

Albach et al.

[11] Patent Number: 5,222,699
[45] Date of Patent: Jun. 29, 1993

[54] VARIABLE CONTROL AIRCRAFT CONTROL SURFACE

[75] Inventors: Walter C. Albach, Dallas; Kenneth J. Fewel, Nacogdoches, all of Tex.

[73] Assignee: LTV Aerospace and Defense Company, Grand Prairie, Tex.

[21] Appl. No.: 509,521

[22] Filed: Apr. 16, 1990

[51] Int. Cl.⁵ .................................................. B64C 3/52
[52] U.S. Cl. ............................ 244/213; 244/90 R; 244/215; 244/219
[58] Field of Search ............. 244/11, 22, 34 R, 35 R, 244/38, 198, 201, 213, 214, 215, 219, 45 R, 46, 90 R, 87, 89, 123, 124, 904

[56] References Cited

U.S. PATENT DOCUMENTS

| 821,393 | 5/1906 | Wright et al. | 244/904 |
|---|---|---|---|
| 1,341,758 | 6/1920 | Parker | 244/219 |
| 1,365,346 | 1/1921 | Schenkel | 244/219 |
| 2,152,029 | 3/1939 | Cone | 244/215 |
| 2,329,133 | 9/1943 | Peed, Jr. | 244/215 |
| 2,973,170 | 2/1961 | Rodman . | |
| 2,979,287 | 4/1961 | Ross . | |
| 3,118,639 | 1/1964 | Kiceniuk . | |
| 3,179,357 | 4/1965 | Lyon | 244/219 |
| 4,053,122 | 10/1977 | Gar | 244/11 |
| 4,471,925 | 9/1984 | Kunz | 244/215 |
| 4,865,275 | 9/1989 | Thompson | 244/219 |

FOREIGN PATENT DOCUMENTS 840739  5/1939  France ............................... 244/213

*Primary Examiner*—Galen Barefoot
*Attorney, Agent, or Firm*—Richards, Medlock & Andrews

[57] ABSTRACT

A variable contour control surface (30a) and a transition section (30a) are designed to eliminate the discontinuities that exist between an aircraft wing control surface and the wing itself. The variable contour is provided by translating the top skin of the control surface relative to the top surface of the wing with the bottom surfaces of the wing and control surface being joined as a single surface. This movement results in a change in the camber of the control surface. The transition section (30a) is a flexible connection between the inboard and outboard ends of the control surface (30a) and the wing. The transition section (30a) is stiffened by rods (40, 41) which run both fore to aft and spanwise within an elastomeric material. The transition section (30b) may be used in conjunction with either a fixed contour control surface or a variable contour control surface.

50 Claims, 4 Drawing Sheets

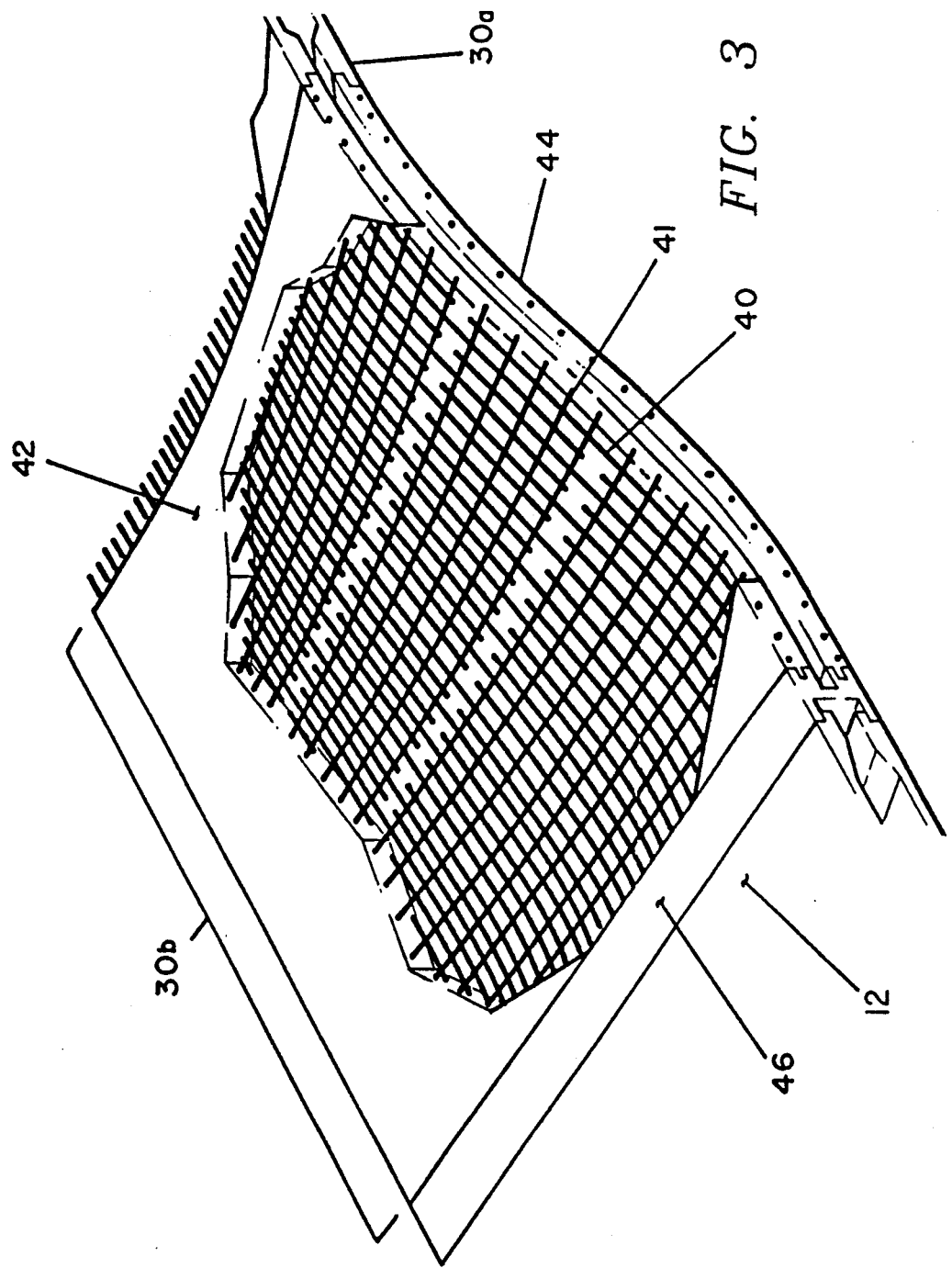

5,222,699

VARIABLE CONTROL AIRCRAFT CONTROL SURFACE

TECHNICAL FIELD OF THE INVENTION

This invention relates to an aircraft control surface. More specifically, this invention relates to a variable contour control surface with a transition section designed to eliminate the discontinuities that exist at the boundaries of a moveable control surface and the fixed wing, tail, canard, or ventral in current aircraft aerodynamic structures.

BACKGROUND OF THE INVENTION

The typical wing design for an aircraft includes a primary wing surface, having a leading edge and a trailing edge, with a control surface located on the leading and trailing edges of the wing. Flaps and ailerons are both examples of control surfaces, with flaps being designed to increase wing lift and ailerons used for roll axis control. The flaps on each wing operate in unison to increase wing lift by increasing the camber of the wing. By comparison, ailerons are pivoted oppositely to increase lift on one wing while reducing lift on the opposite wing to induce a rolling moment. Similarly, the elevator sections of the horizon tail are pivotably attached to the fixed tail section to vary lift and provide pitch control.

When either the flap or the aileron is activated, the control surface rotates relative to the trailing edge of the wing. Control surfaces are typically rigid structures which maintain their shape throughout rotation. Therefore, gaps or abrupt changes occur at the hinge area of a conventional control surface. This gap increases the drag and lowers the efficiency of the control surface. Additionally, as the control surfaces are rotated, gaps are formed between the ends of the hinged control surface and the adjacent portions of the fixed wing.

Several wing structures have been designed which provide for variable camber in an attempt to eliminate the need for separate and distinct control surfaces located at the trailing edge of the wing, which in turn would eliminate the abrupt changes or gaps between the separate control surfaces and the trailing edge of the wing. For example, U.S. Pat. No. 2,979,287 to Ross discloses an inflatable wing with variable camber. The design incorporates an inflatable fabric airfoil having upper and lower surfaces tied together by a plurality of tie threads. The flexible fabric forming the body of the wing is made so that the warp cords extend lengthwise or longitudinally of the wing, with the weft cords extending transversely of the wing. The weft cords are made more elastic or resilient than the warp cords so that by varying the inflation pressure inside the wing, the camber of the wing can be changed together with the effective lift-drag ratio.

U.S. Pat. No. 3,118,639 to Kiceniuk discloses a control and propulsion fluid foil. This design provides a foil construction which utilizes fluid pressure applied within cells contained in the foil construction in a manner to cause the foil to warp. This warping changes the amount of lift force acting on the foil, permitting it to function as a control surface. The application of the variable pressures to a series of cells can also produce an undulating motion. This undulation can function as a propulsion means if the foil were used underwater.

An example of a unique wing reinforcement structure is seen in U.S. Pat. No. 2,973,170 to Rodman which provides lightweight reinforcement on the inner surface of the wing and a smooth porcelainized outer wing surface. The reinforcement comprises a network of crossed wires or rods of relatively small diameter. Where the rods cross one another, the cross rods are flattened against the wing so that the reinforcement is in contact with the wing substantially up to the intersection of the wires or rods.

A need exists for an improved aircraft wing structure providing a control surface that allows for variable camber of the wing while eliminating any gap or abrupt change between the trailing edge of the wing and the joining edges of the control surface. Such a device should also provide an uninterrupted upper boundary wing surface and be durable enough to withstand the conditions encountered during flight.

SUMMARY OF THE INVENTION

The present invention relates to an aircraft control surface designed to eliminate the discontinuities that occur at the hinge and ends of the surface. The design achieves a more efficient airflow, thereby reducing drag, by avoiding the abrupt changes in airflow which normally occur with hinged control surfaces. These abrupt changes can result in an early separation of the airflow and earlier onset of transonic flow over a wing with the hinged and rigid control surface. The invention is applicable to all hinged aerodynamic control surfaces, and the transition section is suitable for all moving control surfaces.

The inventive concept is based on use of a warped airfoil shape to eliminate the gaps and abrupt changes that occur at the hinged area of a conventional control surface, and an elastomeric transition section to provide a smooth transition between the warped and undeflected shapes of the fixed wing or tail surface sections. The warped shape of the control surface is achieved by mechanically shortening or lengthening either one of the surfaces (upper or lower) of the control surface while the other surface deflects to the warp shape. Air loads are supported by the warped surface skins which act as a truss. In addition, the upper and lower skins are connected by elastomeric spars which provide a tension connection but very low shear connection between the skins. An aft facing seal is provided on the surface that is shortened or lengthened to prevent airflow into the airfoil interior area.

The elastomeric transition section is designed to assume a complex S shape required to provide a smooth transition between the deflected control surface and the undeflected wing or horizontal tail section. The transition section is installed in spanwise compression. This allows the transition elastic material to elongate when the control surface deflection induces the transition section S shape.

Air loads on the transition section are supported by spanwise structural rods which are socketed to the warped control surface or the fixed air foil shape. The rods extend over one half the width of the transition section and are designed to slide in oversized holes in the transition section as its length increases to form the complex S shape. In addition, axials or fore and aft, rods are installed at ninety degrees to the spanwise rods to provide a spline to insure a smooth S curve and to distribute the air loads into the spanwise rods.

The edge of the transition section which is too thin to permit use of spanwise rods is fabricated with the edge in tension. When the transition section is compressed for installation, this relaxes the tension molded into the edges so that a waviness is not induced into the edge of the surface. The rods prevent this waviness over the remainder of the transition section. A rigid rib with shear and moment carrying capability is provided at the fixed end of the transition section to complete the aerodynamic control surface.

BRIEF DESCRIPTION OF THE DRAWINGS

For a more complete understanding of the present invention, and for further details and advantages thereof, reference is now made to the following Detailed Description taken in conjunction with the accompanying drawings in which:

FIG. 3 is a perspective view, partly in cross section along line 3—3 in FIG. 1c, of a transition section of an aircraft wing control surface of the present invention;

DETAILED DESCRIPTION OF THE DRAWINGS

The present invention is directed to an aircraft wing structural design having an integrated control surface that overcomes many of the disadvantages found in the prior art. Referring to FIG. 1a, an aircraft 10 is shown to illustrate the location of control surfaces on wing 12, including a control surface 12a on the trailing portion of wing 12. FIG. 1b is an enlargement of a portion of wing 12 wherein the control surface 12a is in the form of a prior art embodiment of a hinged control surface 20. The control surface 20 is hinged at hinge line 24 to wing 12. Gaps 22 exist between the outboard and inboard ends of control surface 20 and the stationary wing 12 as the control surface 20 is moved. Further, a discontinuity exists at hinge line 24.

Figure 1C:
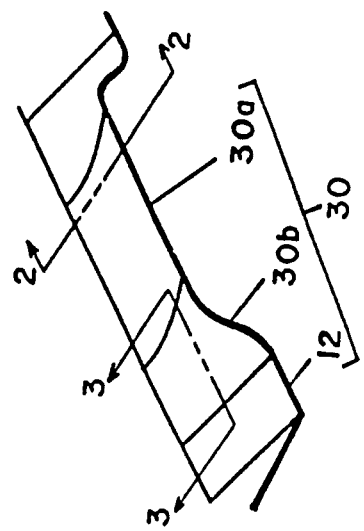
FIG. 1c is a perspective view of an aircraft control surface in the form of a warped control surface with transition sections in accordance with the present invention.
Figure 1A:
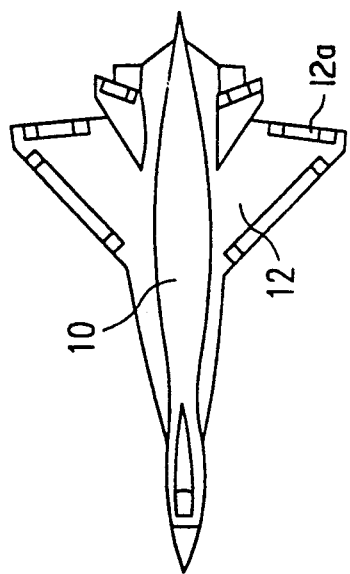
FIG. 1a is a perspective view of aircraft control surfaces on the wing of an airplane.
Figure 1B:
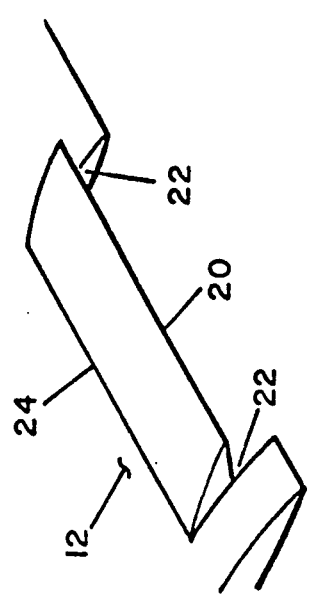
FIG. 1b is a perspective view of an example of an aircraft control surface in the form of a hinged control surface in accordance with the prior art.
Figure 2:
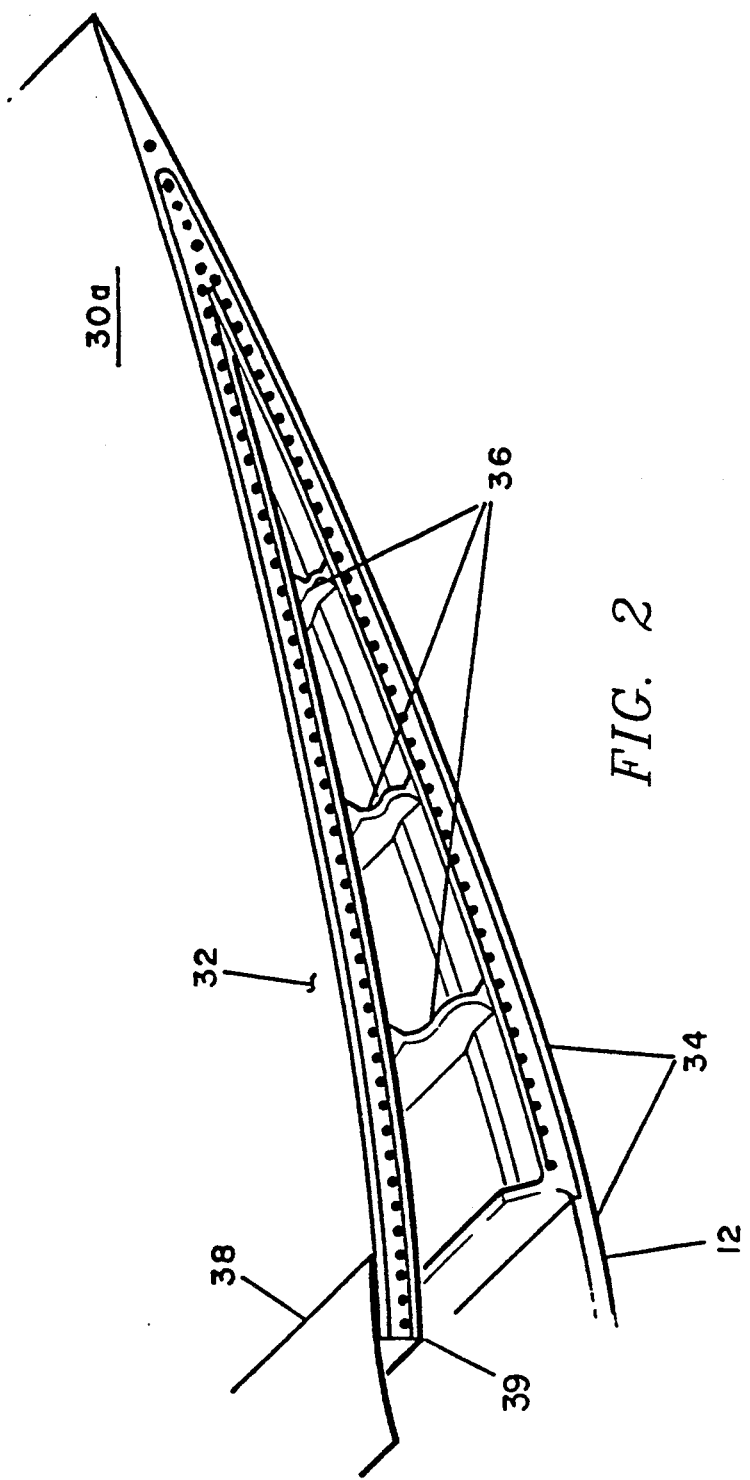
FIG. 2 is a sectional view along line 2—2 in FIG. 1c showing the warped control surface section.

Referring to FIG. 1c, which is an enlargement of a portion of the wing 12 wherein the aircraft control surface 12a is in the form of a warped control surface 30 with transition sections in accordance with an embodiment of the present invention, the control surface 30 incorporates a warped control surface 30a and a transition section 30b between each end of the control surface 30a and the laterally adjacent portion of wing 12. actuator used can be either electrical or hydraulic, linear or rotary with appropriate attachment to the movable upper skin 32 to allow movement in a linear direction. As the movable skin 32 is drawn under seal 38, the camber of the control surface 30a and the orientation of the control surface 30a is changed. Similarly, the camber and orientation of the control surface 30a is changed in the opposite direction as the movable skin 32 is extended. The elastomeric spars 35 prevent the collapse of the control surface 30a. However, due to their composition, they can deform in response to the shear loading generated as the result of movement of movable skin 32 relative to skin 34.

FIG. 3 provides a sectional view of the transition section 30b. The transition sections are located between the outboard and inboard ends of the variable contour control surface 30a and the fixed wing 12. Air loads on the transition section 30b are supported by transfer structural rods 40 and 41 which are provided both spanwise and fore to aft. The rods are positioned in oversized holes in upper and lower thick elastomeric layers 42 and 44, thereby creating a semi-rigid structure. A rib closeout structure 46 is fitted between the fixed wing 12 and the transition section 30b.

Spanwise structural rods 40 are socketed either to the warped control surface 30a or the fixed wing 12. These spanwise structural rods 40 extend over one-half the width of the transition section and are designed to slide in the oversized holes in the transition section 30b as its length increases to form the complex "S" shape. Thus, the spanwise structural rods 40 attached to the end of the contour control surface 30a adjacent the fixed wing 12 overlap the rods 40 attached to the contour control surface 30a in parallel relationship. Axial rods 41 are installed to extend fore and aft, i.e. at 90° to the spanwise rods 40 to provide a spline to insure a smooth "S" curve and distribute the air loads into the spanwise rods 40.

The transition section is installed in spanwise compression. This allows the transition of elastic material to elongated when the control surface deflection induces the transition section "S" shape. The edge of the transition section which is too thin to permit spanwise or fore to aft rods, is fabricated with the edge in tension. When the transition section is compressed for installation, this relaxes the tension molded into the edge so that a waviness is not induced into the edge of the surface. The rods prevent this waviness over the remainder of the transition section. A rigid rib 46 with shear and moment carrying capability is provided at the fixed end of the transition section to complete the aerodynamic control surface. The forward edge of lower surface 44 of the transition section 30b is fixed to wing 12 while the upper surface 42 is free to retract under seal 38.

Figure 4A:
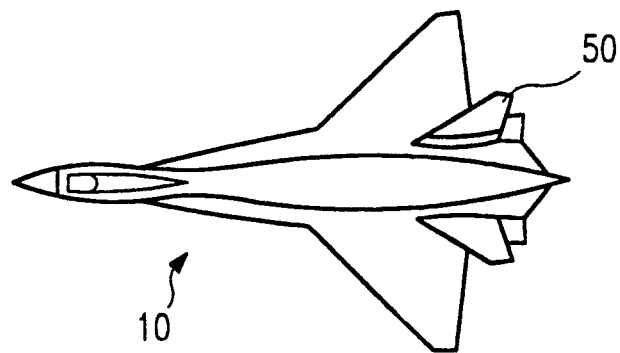
FIG. 4a is a perspective view of a control surface of a tail section of an airplane.
Figure 4B:
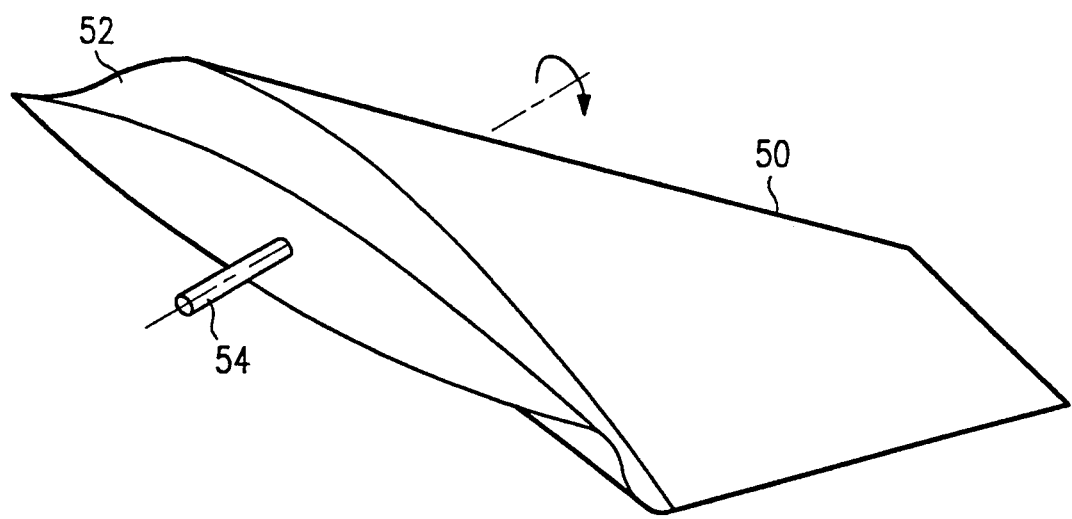
FIG. 4b is a perspective view of a tail section control surface with a transition section in accordance with the present invention.

FIG. 4a provides a perspective view of an aircraft 10 illustrating the location of a horizontal tail section 50. FIG. 4b is an enlargement of the tail section 50 and the associated transition section 52. The transition section 52 is located between the fuselage of aircraft 10 and the associated tail section 50. The horizontal tail section 50 rotates about axis 54. The transition section 52 provides a continuous surface from the fuselage of aircraft 10 to tail section 50, thereby achieving more efficient airflow. This embodiment does not utilize the variable contour control surface of earlier described embodiments. Instead, this embodiment merely utilizes the elastomeric transition section to prevent discontinuities. The transition section has internal construction identical to that shown in FIG. 3.

Thus, it can be seen that the present invention provides an aircraft control surface designed to eliminate the discontinuities that occur at the hinge and at the ends of the surface. The structure achieves a more efficient airflow, and thus provides lower drag, by avoiding the abrupt changes in the air flow direction which normally occurs with hinged control surfaces. By avoiding abrupt changes which can result in early separation of the air flow, and earlier onset of transonic flow over the surface with the hinged control surface, the present structure provides substantial aerodynamic improvements. The structure is suitable for all hinged aerodynamic control surfaces and the transition section is suitable for all moving control surfaces.

The structural is achieved by use of a warped airfoil shape to eliminate the gaps and abrupt changes that occur at the hinge area of a convention control surface, and an elastomeric transition section to provide a smooth transition between the warped and the undeflected shape of the fixed wing or tail surface section. The warped shape of the control surface is achieved by mechanically shortening or lengthening either one of the surfaces (either the upper or lower surface) of the control surface while the other surface deflects to the warped shape. Air loads are supported by the warped surface skins which act as a truss. In addition, the upper and lower skins are connected by elastomeric spars which provide a tension connection but very lower shear connection between the skins. An aft facing seal is provided on the surface that is shortened or lengthened to prevent air flow into the airfoil interior surface. The elastomeric transition section is designed to assume a complex "S" shape required to provide a smooth transition between the deflected control surface and the adjacent fixed wing. The elastomeric transition section may also be used individually to provide a continuous surface between the fuselage and any moving fixed contour control surface.

Although preferred embodiments within the invention have been described in the foregoing description and illustrated in the accompanying drawings, it will be understood that the invention is not limited to the embodiments disclosed, but is capable of numerous rearrangements, modifications, substitution of parts and elements without departing from the spirit of the invention. Accordingly, the present invention is intended to encompass such rearrangements, modifications and substitutions of parts and elements as followed in spirit and scope of the invention.

We claim:

1. An aircraft wing assembly comprising:
   (a) a main wing portion having a top skin and a bottom skin;
   (b) a variable contour control surface having a top skin and a bottom skin, either said top skin of said variable contour control surface or said bottom skin of said variable contour control surface being attached to the corresponding top or bottom skin of the main wing portion and the other skin of said variable contour control surface being translatable relative to the corresponding other skin of the main wing portion;
   (c) means for translating said translatable skin relative to the main wing portion; and
   (d) elastomeric spars attached between the top and bottom skins of the variable contour control surface, said spars being flexible in shear to permit the change of camber in said variable contour control surface as said translatalbe skin moves relative to the main wing portion.

2. The aircraft wing assembly according to claim 1 wherein said spars are positioned spanwise along said variable contour control surface.

3. The aircraft wing assembly according to claim 1 further comprising:
   a transition section between at least one end of said variable contour control surface and the adjacent section of the main wing portion.

4. The aircraft wing assembly according to claim 3 wherein said transition section has upper and lower elastomeric layers joining the top and bottom skins, respectively, of said variable contour control surface to the corresponding top and bottom skins of the main wing portion.

5. The aircraft wing assembly according to claim 4 further comprising:
   a plurality of rods positioned within said elastomeric layers to support loads on said transition section.

6. The aircraft wing assembly according to claim 5 wherein said rods are positioned spanwise within one or both of said elastomeric layers.

7. The aircraft wing assembly according to claim 6 further comprising rods positioned fore to aft in one or both of said elastomeric layers.

8. The aircraft wing assembly according to claim 6 wherein some of said rods are attached at one end to said main wing portion and others of said rods are attached at one end to said variable contour control surface.

9. The aircraft wing assembly according to claim 6 wherein some of said rods have one end thereof attached to said main wing portion with the other end thereof being a free end, and others of said rods have one end thereof attached to said variable contour control surface with the other end thereof being a free end, and wherein said rods are positioned in oversize holes in said transition section with the free ends of said some of said rods overlapping the free ends of said others of said rods.

10. An aircraft wing assembly comprising:
    (a) a main wing portion having a top skin and a bottom skin;
    (b) a variable contour control surface having a top skin and a bottom skin, said variable contour control surface having an inboard end, an outboard end, a forward edge and a trailing edge, said variable contour control surface being attached along its forward edge to the main wing portion so as to permit hinged movement between said variable contour control surface and said main wing portion;
    (c) at least one elastomeric spar attached to the top and bottom skins of the variable contour control surface, said at least one elastomeric spar extending in a spanwise direction; and
    (d) a transition section extending between and joining one of the inboard end and the outboard end of said variable contour control surface and the adjacent section of the main wing portion, said adjacent section of the main wing portion having a fixed contour, said transition section having upper and lower elastomeric layers joining the top and bottom skins, respectively, of the said variable contour control surface to the corresponding top and bottom skins of said adjacent section of the main wing portion.

11. The aircraft wing assembly according to claim 10 further comprising:
    a plurality of rods positioned within said elastomeric layers to support loads on said transition section.

12. An aircraft wing assembly comprising:
    (a) a main wing portion having a top skin and a bottom skin;

(b) a variable contour control surface having a top skin and a bottom skin, said variable contour control surface being attached along its forward edge to the main wing portion so as to permit hinged movement between said variable contour control surface and said main wing portion;

(c) at least one elastomeric spar attached between the top and bottom skins of the variable contour control surface; and (d) a transition section extending between at least one end of said variable contour control surface and the adjacent section of the main wing portion, said transition section having upper and lower elastomeric layers joining the top and bottom skins, respectively, of the said variable contour control surface to the corresponding top and bottom skins of the main wing portion;

wherein a plurality of rods are positioned within said elastomeric layers to support loads on said transition section; and wherein said rods are positioned spanwise within one or both of said elastomeric layers.

13. The aircraft wing assembly according to claim 12 wherein some of said rods are attached at one end to said main wing portion and others of said rods are attached at one end to said variable contour control surface.

14. The aircraft wing assembly according to claim 12 wherein some of said rods have one end thereof attached to said main wing portion with the other end thereof being a free end, and others of said rods have one end thereof attached to said variable contour control surface with the other end thereof being a free end, and wherein said rods are positioned in oversize holes in said transition section with the free ends of said some of said rods overlapping the free ends of said others of said rods.

15. The aircraft wing assembly according to claim 13 further comprising rods positioned fore to aft in one or both of said elastomeric layers.

16. In an aircraft wing assembly having a main wing portion with a top skin and a bottom skin and a control surface having a corresponding top skin and a bottom skin, said control surface having an inboard end, an outboard end, a forward edge and a trailing edge, said control surface being hinged at its forward edge to the main wing portion, a transition section extending between and joining one of the inboard end of said control surface and the outboard end of said control surface and the adjacent section of the main wing portion, said adjacent section of the main wing portion having a fixed contour and a trailing edge, said transition section comprising:

upper and lower elastomeric layers joining the top and bottom skins, respectively, of the control surface to the corresponding top and bottom skins of the main wing portion, said transition section being installed in compression between said control surface and the adjacent section of the main wing portion to allow said elastomeric layers to elongate.

17. The aircraft wing assembly according to claim 16 further comprising:

a plurality of rods positioned within said elastomeric layers to support loads on said transition section.

18. In an aircraft wing assembly having a main wing portion with a top skin and a bottom skin and a control surface having a corresponding top skin and a bottom skin, said control surface being hinged at its forward edge to the main wing portion, a transition section between at least one end of said control surface and the adjacent section of the main wing portion, said transition section comprising:

upper and lower elastomeric layers joining the top and bottom skins, respectively, of the control surface to the corresponding top and bottom skins of the main wing portion; and a plurality of rods positioned within said elastomeric layers to support loads on said transition section;

wherein said rods are positioned spanwise within one or both of said elastomeric layers.

19. The aircraft wing assembly according to claim 18 further comprising rods positioned fore to aft in one or both of said elastomeric layers.

20. The aircraft wing assembly according to claim 18 wherein some of said rods are attached at one end to said main wing portion and others of said rods are attached at one end to said control surface.

21. The aircraft wing assembly according to claim 18 wherein some of said rods have one end thereof attached to said main wing portion with the other end thereof being a free end, and others of said rods have one end thereof attached to said control surface with the other end thereof being a free end, and wherein said rods are positioned in oversize holes in said transition section with the free ends of said some of said rods overlapping the free ends of said others of said rods.

22. An aircraft wing assembly comprising:

(a) a main wing portion having a fixed contour trailing edge;

(b) a variable contour control surface, said variable contour control surface having an inboard end, an outboard end, a leading edge and a trailing edge; said leading edge of said variable contour control surface being attached to the fixed contour trailing edge of the main wing portion, wherein said variable contour control surface comprises a top skin and a bottom skin defining an airfoil shape, said top skin and said bottom skin being separated from each other by at least one spanwise elastomeric spar;

(c) means to adjust the camber of said variable contour control surface; and (d) a transition section extending between and joining one of the inboard end and the outboard end of said variable contour control surface and the adjacent portion of the fixed contour trailing edge of the main wing portion.

23. The aircraft wing assembly according to claim 22 wherein at least one spanwise spar is rigidly fixed to the inner surfaces of both the top skin and the bottom skin and is capable of elastic deformation.

24. The aircraft wing assembly according to claim 22 wherein said transition section comprises:

a flexible connection extending between and joining one of the inboard end and the outboard end of said variable contour control surface and the adjacent portion of the fixed contour trailing edge of said main wing portion.

25. The aircraft wing assembly according to claim 22 wherien said transition section further comprises a plurality of rods embedded within an elastomeric material.

26. An aircraft wing assembly comprising:

(a) a main wing portion having a trailing edge;

(b) a variable contour control surface attached to the trailing edge of the main wing portion, wherein said variable contour control surface comprises a top skin and a bottom skin defining an airfoil shape, said top skin and said bottom skin being separated from each other by at least one spanwise elastomeric spar;

(c) means to adjust the camber of said variable contour control surface; and (d) a transition section between at least one end of said variable contour control surface and the adjacent portion of the trailing edge of the main wing portion;

wherein said top skin is slidable both fore and aft and said bottom skin is fixed to the main wing portion.

27. An aircraft wing assembly comprising:
(a) a main wing portion having a trailing edge;
(b) a variable contour control surface attached to the trailing edge of the main wing portion, wherein said variable contour control surface comprises a top skin and a bottom skin defining an airfoil shape, said top skin and said bottom skin being separated from each other by at least one spanwise elastomeric spar;
(c) means to adjust the camber of said variable contour control surface; and
(d) a transition section between at least one of said variable contour control surface and the adjacent portion of the trailin edge of the main wing portion;
wherein said transition section further comprises a first plurality of rods running fore and aft and a second plurality of rods running spanwise.

28. The aircraft wing assembly according to claim 27 wherein said second plurality of rods running spanwise are attached at one end to either the variable contour control surface or to the trailing edge of said main wing portion.

29. The aircraft wing assembly comprising:
(a) a main wing portion having a trailing edge of fixed contour;
(b) a variable contour control surface having a flexible top surface translatable relative to the top surface of the trailing edge of the main wing portion and a flexible bottom surface attached to the trailing edge of the main wing portion, said flexible top surface by at least one elastomeric spar running through the variable contour control surface;
(c) means for adjusting the camber of said variable contour control surface;
(d) means for sealing the space between the flexible top surface of the variable contour control surface and the top surface of the trailing edge of the main wing portion; and
(e) a flexible transition section between at least one end of said variable contour control section and the trailing edge of the main wing portion.

30. The aircraft wing assembly of claim 29 wherein said flexible top surface of said variable contour control surface is slidable both fore and aft under the trailing edge of said main wing portion.

31. The aircraft wing assembly of claim 29 wherein said transition section comprises:
an elastomeric sheet with oversized tunnels running spanwise and structural rods located in said tunnels.

32. The aircraft wing assembly of claim 31 wherien a rib closeout structure is positioned between the transition section and the adjacent section of the main wing portion, and wherein said structural rods are rotatably attached to either the variable contour control surface or the rib closeout structure.

33. An aircraft control surface assembly comprising:
(a) a main fuselage portion;
(b) a movable control surface attached to said main fuselage portion and having an outboard end and an inboard end; and
(c) a transition section positioned between the inboard end of the movable control surface and the adjacent section of the main fuselage portion and providing a continuous surface from said adjacent section of the main fuselage portion to the moveable control surface, wherein said transition section has upper and lower elastomeric layers and a first plurality of rods positioned within said elastomeric layers to support loads on said transition section, said first plurality of rods extending between the moveable control surface and said adjacent section of the main fuselage portion, and a second plurality of rods positioned within said elastomeric layers and extending at least generally perpendicularly to said first plurality of rods to distribute loads into said first plurality of rods.

34. An aircraft control surface assembly comprising:
(a) a main fuselage portion;
(b) a movable control surface attached to said main fuselage portion; and
(c) a transition section positioned between the movable control surface and the adjacent section of the main fuselage portion, wherein said transition section has upper and lower elastomeric layers and a plurality of rods positioned within said elastomeric layers to support loads on said transition section;
wherein said rods are positioned in oversize holes in said elastomeric layers.

35. An aircraft control surface assembly comprising:
(a) a main fuselage portion;
(b) a movable control surface attached to said main fuselage portion; and
(c) a transition section positioned between the movable control surface and the adjacent section of the main fuselage portion, wherein said transition section has upper and lower elastomeric layers and a first plurality of rods positioned within said elastomeric layers to support loads on said transition section,
wherein some of said rods have one end thereof attached to said movable control surface with the other end thereof being a free end, and others of said rods have one end thereof attached to said main fuselage portion with the other end thereof being a free end, such that the free ends of said some of said rods are overlapping the free ends of said others of said rods.

36. An aircraft wing assembly comprising:
(a) a main wing portion having a top skin and a bottom skin;
(b) a variable contour control surface having a top skin and a bottom skin, either said top skin of said variable contour control surface or said bottom skin of said variable contour control surface being attached to the corresponding top or bottom skin of the main wing portion and the other skin of said variable contour control surface being translatable relative to the corresponding other skin of the main wing portion;
(c) means for translating said translatable skin relative to the main wing portion;

(d) elastomeric spars attached between the top and bottom skins of the variable contour control surface, said spars being flexible in shear to permit the change of camber in said variable contour control surface as said translatable skin moves relative to the main wing portion;

(e) a transition section between at least one end of said variable contour control surface and the adjacent section of the main wing portion, said transition section having upper and lower elastomeric layers joining the top and bottom skins, respectively, of said variable contour control surface to the corresponding top and bottom skins of the main wing portion; and (f) a plurality of rods positioned within said elastomeric layers to support loads on said transition section, said rods being positioned spanwise within one or both of said elastomeric layers.

37. The aircraft wing assembly according to claim 36 further comprising rods positioned fore to aft in one or both of said elastomeric layers.

38. The aircraft wing assembly according to claim 36 wherein some of said rods are attached at one end to said main wing portion and others of said rods are attached at one end to said variable contour control surface.

39. The aircraft wing assembly according to claim 36 wherein some of said rods have one end thereof attached to said main wing portion with the other end thereof being a free end, and others of said rods have one end thereof attached to said variable contour control surface with the other end thereof being a free end, and wherein said rods are positioned in oversize holes in said transition section with the free ends of said some of said rods overlapping the free ends of said others of said rods.

40. An aircraft wing assembly comprising:
(a) a main wing portion having a top skin and a bottom skin;
(b) a variable contour control surface having a top skin and a bottom skin, said variable contour control surface having an inboard end, an outboard end, a forward edge and a trailing edge, said variable contour control surface being attached along its forward edge to the main wing portion so as to permit hinged movement between said variable contour control surface and said main wing portion;
(c) a transition section extending between and joining one of the inboard end of said variable contour control surface and the outboard end of said variable contour control surface and the adjacent section of the main wing portion, said adjacent section of the main wing portion having a fixed contour, wherein said transition section has upper and lower elastomeric layers joining the top and bottom skins, respectively, of the said variable contour control surface to the corresponding top and bottom skins of said adjacent section of the main wing portion; and
(d) a plurality of rods positioned within one or both of said elastomeric layers to support loads on said transition section.

41. An aircraft wing assembly comprising:
(a) a main wing portion having a top skin and a bottom skin;
(b) a variable contour control surface having a top skin and a bottom skin, said variable contour control surface being attached along its forward edge to the main wing portion so as to permit hinged movement between said variable contour control surface and said main wing portion;
(c) a transition section between at least one end of said variable contour control surface and the adjacent section of the main wing portion wherein said transition section has upper and lower elastomeric layers joining the variable top and bottom skins, respectively, of the said variable contour control surface to the corresponding top and bottom skins of the main wing portion; and
(d) a plurality of rods positioned within one or both of said elastomeric layers to support loads on said transition section;
wherein said rods are positioned spanwise within one or both of said elastomeric layers.

42. The aircraft wing assembly according to claim 41 further comprising rods positioned fore to aft within one or both of said elastomeric layers.

43. An aircraft wing assembly comprising:
(a) a main wing portion having a top skin and a bottom skin;
(b) a variable contour control surface having a top skin and a bottom skin, said variable contour control surface being attached along its forward edge to the main wing portion so as to permit hinged movement between said variable contour control surface and said main wing portion;
(c) a transition section between at least one end of said variable contour control surface and the adjacent section of the main wing portion wherein said transition section has upper and lower elastomeric layers joining the top and bottom skins, respectively, of the said variable contour control surface to the corresponding top and bottom skins of the main wing portion; and
(d) a plurality of rods positioned within one or both of said elastomeric layers to support loads on said transition section;
wherein some of said rods are attached at one end to said main wing portion and others of said rods are attached at one end to said variable contour control surface.

44. An aircraft wing assembly comprising:
(a) a main wing portion having a top skin and a bottom skin;
(b) a variable contour control surface having a top skin and a bottom skin, said variable contour control surface being attached along its forward edge to the main wing portion so as to permit hinged movement between said variable contour control surface and said main wing portion;
(c) a transition section between at least one end of said variable contour control surface and the adjacent section of the main wing portion wherein said transition section has upper and lower elastomeric layers joining the top and bottom skins, respectively, of the said variable contour control surface to the corresponding top and bottom skins of the main wing portion; and
(d) a plurality of rods positioned within one or both of said elastomeric layers to support loads on said transition section;
wherein some of said rods have one end thereof attached to said main wing portion with the other end thereof being a free end, and others of said rods have one end thereof attached to said variable contour control surface with the other end thereof being a free end, and wherein said rods are positioned in oversize holes in said transition section with the free ends of said some of said rods overlapping the free ends of said others of said rods.

45. In an aircraft wing assembly having a main wing portion with a top skin and a bottom skin and a control surface having a corresponding top skin and a corresponding bottom skin, said control surface being hinged at its forward edge to the main wing portion, a transition section between at least one end of said control surface and the adjacent section of the main wing portion, said transition section comprising:
- (a) upper and lower elastomeric layers joining the top and bottom skins, respectively, of the control surface to the corresponding top and bottom skins of the main wing portion; and
- (b) a plurality of rods positioned within one or both of said elastomeric layers to support loads on said transition section, said rods being positioned spanwise.

46. The aircraft wing assembly according to claim 45 further comprising rods positioned fore to aft in at least one of said elastomeric layers.

47. The aircraft wing assembly according to claim 45 wherein some of said rods are attached at one end to said main wing portion and others of said rods are attached at one end to said control surface.

48. The aircraft wing assembly according to claim 45 wherein some of said rods have one end thereof attached to said main wing portion with the other end thereof being a free end, and others of said rods have one end thereof attached to said control surface with the other end thereof being a free end, and wherein said rods are positioned in oversize holes in said transition section with the free ends of said some of said rods overlapping the free ends of said others of said rods.

49. An aircraft wing assembly comprising:
- (a) a main wing portion having a trailing edge of fixed contour, said trailing edge having a top surface and a bottom surface;
- (b) a variable contour control surface having a flexible top surface translatable relative to the top surface of the trailing edge of the main wing portion and a flexible bottom surface attached to the trailing edge of the main wing portion, said flexible top surface of said variable contour control surface being separated from said flexible bottom surface of said variable contour control surface by at least one elastomeric spar running spanwise through the variable contour control surface;
- (c) means for adjusting the camber of said variable contour control surface;
- (d) means for sealing the space between the flexible top surface of the variable contour control surface and the top surface of the trailing edge of the main wing portion; and
- (e) a flexible transition section positioned between at least one end of said variable contour control surface and the adjacent section of the trailing edge of the main wing portion, said transition section comprising an elastomeric sheet with oversized tunnels running spanwise and structural rods slidably located in said tunnels.

50. The aircraft wing assembly of claim 49 wherien a rib closeout structure is positioned between the transition section and the adjacent section of the trailing edge of the main wing portion, and wherein said structural rods are rotatably attached to either the variable contour control surface or to the rib closeout structure.

* * * * *

UNITED STATES PATENT AND TRADEMARK OFFICE
CERTIFICATE OF CORRECTION

PATENT NO. : 5,222,699

DATED : June 29, 1993

INVENTOR(S) : Walter C. Albach et al

It is certified that error appears in the above-identified patent and that said Letters Patent is hereby corrected as shown below:

In the TITLE on the title page, change "VARIABLE CONTROL" to --VARIABLE CONTOUR--.

Column 1, TITLE of the patent, change "VARIABLE CONTROL" to --VARIABLE CONTOUR--.

Column 5, line 62, change "translatalbe" to --translatable--.

Column 8, line 51, change "assembly according to" to --assembly of--.

Column 8, line 55, change "assembly according to" to --assembly of--.

Column 8, line 62, change "assembly according to" to --assembly of--.

Column 8, line 63, change "wherien" to --wherein--.

Column 9, line 25, change "one of" to --one end of--.

Column 9, line 31, change "assembly according to" to --assembly of--.

Column 9, line 65, change "wherien" to --wherein--.

Column 10, line 44, delete "first".

UNITED STATES PATENT AND TRADEMARK OFFICE
CERTIFICATE OF CORRECTION

PATENT NO. : 5,222,699

DATED : June 29, 1993

INVENTOR(S) : Walter C. Albach et al

It is certified that error appears in the above-identified patent and that said Letters Patent is hereby corrected as shown below:

Column 14, line 30, change "wherien" to --wherein--.

Signed and Sealed this

Eighth Day of March, 1994

Attest:

BRUCE LEHMAN

Attesting Officer

Commissioner of Patents and Trademarks